United States Patent
Suzuki et al.

(10) Patent No.: US 9,476,782 B2
(45) Date of Patent: Oct. 25, 2016

(54) STRAIN SENSOR

(71) Applicants: Yamaha Corporation, Hamamatsu-Shi, Shizuoka-Ken (JP); NATIONAL UNIVERSITY CORPORATION SHIZUOKA UNIVERSITY, Shizuoka-Shi, Shizuoka-ken (JP)

(72) Inventors: Katsunori Suzuki, Hamamatsu (JP); Shingo Sakakibara, Hamamatsu (JP); Koji Yataka, Hamamatsu (JP); Yasuro Okumiya, Hamamatsu (JP); Masahiro Sugiura, Hamamatsu (JP); Yoku Inoue, Hamamatsu (JP)

(73) Assignees: Yamaha Corporation, Hamamatsu (JP); National University Corporation Shizuoka University, Shizuoka (JP)

( * ) Notice: Subject to any disclaimer, the term of this patent is extended or adjusted under 35 U.S.C. 154(b) by 41 days.

(21) Appl. No.: 14/274,305

(22) Filed: May 9, 2014

(65) Prior Publication Data
US 2014/0331793 A1    Nov. 13, 2014

(30) Foreign Application Priority Data

May 10, 2013 (JP) .................................. 2013-100751
Jan. 8, 2014 (JP) .................................. 2014-002044

(51) Int. Cl.
*G01L 1/22* (2006.01)
*B82Y 30/00* (2011.01)

(52) U.S. Cl.
CPC .............. *G01L 1/2287* (2013.01); *B82Y 30/00* (2013.01); *Y10T 156/1092* (2015.01)

(58) Field of Classification Search
CPC  B82Y 30/00; G01L 1/2287; Y10T 156/1092

USPC ........................... 73/862.629; 156/299, 280
See application file for complete search history.

(56) References Cited

U.S. PATENT DOCUMENTS 7,523,670 B2    4/2009  Meyer et al.
2004/0031311 A1  2/2004  Meyer et al.
(Continued)

FOREIGN PATENT DOCUMENTS

CN    1962429 A     5/2007
CN    101121859     2/2008
(Continued)

OTHER PUBLICATIONS

Shimizu et al.; "Growth and Application of Ultra-Long Multi-Walled Carbon Nanotube"; Journal of Automation, Mobile Robotics & Intelligent Systems, vol. 3, No. 4, 2009, pp. 163-165.
(Continued)

*Primary Examiner* — Lisa Caputo
*Assistant Examiner* — Philip Cotey
(74) *Attorney, Agent, or Firm* — Blank Rome LLP (57) ABSTRACT

A strain sensor provided with a substrate that has flexibility; a carbon nanotube (CNT) film that is provided on the surface of the substrate and that has a plurality of CNT fibers oriented in one direction; and a pair of electrodes that are arranged at both ends in the orientation direction of the CNT fibers in the CNT film; in which the CNT film has a plurality of CNT fiber bundles that consist of the plurality of CNT fibers, and a resin layer that covers the peripheral surface of the plurality of the CNT fiber bundles and joins with the surface of the substrate.

8 Claims, 8 Drawing Sheets

(56) References Cited

U.S. PATENT DOCUMENTS

| | | |
|---|---|---|
| 2004/0041154 A1* | 3/2004 | Watanabe ............... B81C 1/00 257/77 |
| 2005/0069796 A1 | 3/2005 | Iwasaki et al. |
| 2005/0086794 A1 | 4/2005 | Fukunaka et al. |
| 2005/0209392 A1 | 9/2005 | Luo et al. |
| 2005/0260412 A1 | 11/2005 | Gardner |
| 2006/0025511 A1 | 2/2006 | Silvers et al. |
| 2006/0113510 A1 | 6/2006 | Luo et al. |
| 2006/0123918 A1 | 6/2006 | Ogisu et al. |
| 2006/0253942 A1 | 11/2006 | Barrera et al. |
| 2006/0278945 A1 | 12/2006 | Sakurai |
| 2006/0283262 A1 | 12/2006 | Smits et al. |
| 2007/0012111 A1 | 1/2007 | Kim |
| 2007/0261493 A1 | 11/2007 | Kim |
| 2008/0011086 A1 | 1/2008 | Kim |
| 2008/0170982 A1 | 7/2008 | Zhang et al. |
| 2008/0186563 A1 | 8/2008 | Chen |
| 2008/0249207 A1 | 10/2008 | Whiteley et al. |
| 2009/0007685 A1 | 1/2009 | Cheng et al. |
| 2009/0186959 A1 | 7/2009 | Kim |
| 2009/0226833 A1 | 9/2009 | Sato et al. |
| 2009/0258241 A1 | 10/2009 | Shiraishi et al. |
| 2009/0269560 A1 | 10/2009 | Dhinojwala et al. |
| 2009/0302411 A1 | 12/2009 | Massetti |
| 2010/0085067 A1 | 4/2010 | Gabriel et al. |
| 2010/0104967 A1 | 4/2010 | Ikeda et al. |
| 2010/0132476 A1 | 6/2010 | Cheng et al. |
| 2010/0144205 A1 | 6/2010 | Searfass |
| 2010/0248100 A1 | 9/2010 | Ezumi |
| 2010/0315790 A1 | 12/2010 | Imaoka et al. |
| 2011/0049579 A1 | 3/2011 | Dumitru et al. |
| 2011/0050040 A1 | 3/2011 | Yamamoto et al. |
| 2011/0050041 A1 | 3/2011 | Yamamoto et al. |
| 2011/0081724 A1 | 4/2011 | Swager et al. |
| 2011/0147715 A1 | 6/2011 | Rogers et al. |
| 2011/0217451 A1 | 9/2011 | Veerasamy |
| 2011/0304579 A1 | 12/2011 | Feng et al. |
| 2011/0304991 A1 | 12/2011 | Huang et al. |
| 2011/0319260 A1 | 12/2011 | Nakayama et al. |
| 2012/0085970 A1* | 4/2012 | Zhang ............... B29C 45/0005 252/182.32 |
| 2012/0282453 A1* | 11/2012 | Wang ................ B29C 70/62 428/299.1 |

FOREIGN PATENT DOCUMENTS

| | | |
|---|---|---|
| CN | 101570662 A | 11/2009 |
| CN | 101672619 A | 3/2010 |
| CN | 102095362 A | 6/2011 |
| CN | 202329535 U | 7/2012 |
| JP | 62-200701 | 9/1987 |
| JP | 2003-227808 A | 8/2003 |
| JP | 2005-070038 A | 3/2005 |
| JP | 2005-223107 | 8/2005 |
| JP | 2006-292478 A | 10/2006 |
| JP | 2009-189747 | 8/2009 |
| JP | 2010-047702 | 3/2010 |
| JP | 2010-281824 A | 12/2010 |
| JP | 2011-047702 A | 3/2011 |
| WO | WO-2004-065926 A1 | 8/2004 |
| WO | WO 2008/135606 A1 | 11/2008 |
| WO | WO-2011/024539 A1 | 3/2011 |

OTHER PUBLICATIONS

Inoue et al.; "Anisotropic carbon nanotube papers fabricated from multiwalled carbon nanotube webs"; Carbon 49 (2011), pp. 2437-2443.

Ghemes et al.; "Synthesis of Long and Spinnable Multi-Walled Carbon Nanotubes"; Journal of Advanced Research in Physics 3(1), 011209 (2012), 3 pages.

US Office Action issued for U.S. Appl. No. 13/673,186, mailing date Nov. 5, 2013.

Kang, I., et al.; "A carbon nanotube strain sensor for structural health monitoring"; Smart Materials and Structures, IOP Publishing Ltd., Bristol, GB, vol. 15, No. 3, Jun. 1, 2006, pp. 737-748.

European Search Report issued for EP Application No. 14 16 7525.6, mailing date Sep. 22, 2014.

Hidenori Mimura et al., "Fast Growth of Carbon Nanotube and Fibrilization Thereof." (Keynote Lecture) Information-Intelligence-Precision Equipment Division Lecture Meeting Proceedings, Mar. 16, 2010, pp. 1-5.

Japanese Office Action dated Sep. 8, 2015 for Japanese Application No. 2011-249172.

U.S. Office Action dated Dec. 18, 2014 issued in connection with U.S. Appl. No. 13/673,186.

Third Office Action issued in Chinese Patent Application No. 201210449457.1 mailed May 18, 2016.

* cited by examiner

STRAIN SENSOR

BACKGROUND OF THE INVENTION

1. Field of the Invention

The present invention relates to a strain sensor.

Priority is claimed on Japanese Patent Application No. 2013-100751, filed May 10, 2013, and Japanese Patent Application No. 2014-2044, filed Jan. 8, 2014, the content of which are incorporated herein by reference.

2. Description of Related Art

A strain sensor that detects strain is constituted so as to detect strain from the resistance change of a resistive body with respect to strain (extension and contraction). A metal or semiconductor is generally used as this resistive body. However, since the reversible amount of extendable and contractable deformation of a metal or semiconductor is small, the applications of a strain sensor are limited.

Therefore, a device using carbon nanotubes (CNT) as the resistive body has been proposed (refer to Japanese Unexamined Patent Application Publication No. 2003-227808). In this device, a CNT film or the like is used consisting of a plurality of CNTs that are oriented in a predetermined direction.

However, in the conventional device, since the CNT film is arranged in a state of contact with the outside air, problems arise in relation to the durability (service life) of the sensor function, such as the occurrence of abnormalities in the resistance change due to contamination of the CNT film by foreign substances and adhesion of moisture and floating gas to the CNTs, and the occurrence of falling off of the CNT film.

Also, in the case of the conventional device, although it is possible to increase the linearity of the resistance change, in addition to the problem of contamination of the CNT film by foreign substances, there is also a risk of CNTs shifting to a direction perpendicular to their direction of extension and contraction so that the CNTs make contact with each other, causing unforeseen resistance changes and response delays.

SUMMARY OF THE INVENTION

The present invention was achieved in view of the aforementioned circumstances, and has as its object to provide a strain sensor that is capable of inhibiting the occurrence of contamination of the CNT film by foreign substances and enhancing the durability of the sensor function while improving the linearity of the resistance change and responsiveness.

In order to solve the aforementioned problems, the strain sensor of the present invention is provided with a substrate that has flexibility, a carbon nanotube (CNT) film that is provided on the surface of this substrate and that has a plurality of CNT fibers oriented in one direction; and a pair of electrodes that are arranged at both ends in the orientation direction of the CNT fibers in the CNT film, in which the CNT film has a plurality of CNT fiber bundles that consist of the plurality of CNT fibers, and a resin layer that covers the peripheral surface of the plurality of the CNT fiber bundles and joins with the surface of the substrate.

This strain sensor is capable of sensing strain by the change in electrical resistance of the CNT film upon extending or contracting in the direction of causing the pair of electrodes to respectively move away from or approach each other (electrode arrangement direction). Since the orientation direction of the CNT fiber bundles that the CNT film has and the electrode arrangement direction are approximately the same direction, and the peripheral surface of the CNT fiber bundles that consist of the plurality of CNT fibers is covered with the resin layer in this strain sensor, the linearity of the resistance change of the CNT film is high.

In order to more specifically describe the resistance change of the CNT film, a description shall be given with an example comparing with the strain sensor of the present invention a strain sensor in which CNT fibers are arranged in a direction perpendicular with the electrode arrangement direction (hereinbelow called a "perpendicular arrangement strain sensor"). In this perpendicular arrangement strain sensor, since extension in the electrode arrangement direction leads to a dramatic increase in the distance between the CNT fibers in the extension direction, and compression applied in the thickness direction of the strain sensor causes a decrease in the distance between the CNT fibers, linearity of the resistance change is difficult to obtain.

In contrast, in the strain sensor of the present invention, since resistance changes occur due to the CNT fibers in the CNT bundles breaking and separating at random locations as a result of extension of the strain sensor, and the compression in the thickness direction is low, the linearity of the resistance change is high. The periphery of the CNT fiber bundles of this strain sensor is covered with a resin layer. Also, the resin layer partially impregnates to the periphery of the CNT fiber bungles so as to form an impregnated portion. This resin layer and the impregnated portion play the role of a guide, and since a non-impregnated portion, which is not impregnated with the resin layer, of the CNT fiber bundle is prevented from coming into contact with other fiber bundles due to free movement other than in the extension/contraction direction, it is possible to inhibit unforeseen resistance changes, and further increase the linearity of the resistance change.

Furthermore, since the periphery of the CNT fiber bundles in the strain sensor of the present invention is covered with the resin layer and the impregnated portion as described above, when the CNT fibers in the CNT fiber bundles are broken, a space that is isolated from the outside is formed between the broken end portions of the CNT fibers. The pressure in this space is considered to be lower than the atmospheric pressure (negative pressure), and so during contraction of the strain sensor (during release of the strain), the contraction of the strain sensor is biased by the contraction force of this gap. Moreover, within this gap, since friction among the CNT fibers and between the CNT fibers and the periphery resin is reduced, movement of the CNT fibers is not easily restricted by the residual stress of the resin. As a result, since the broken end portions of the CNT fibers quickly reestablish contact during contraction of the strain sensor, this strain sensor can obtain a high responsiveness.

In addition, in the strain sensor of the present invention, the CNT film has the resin layer and the impregnated portion that covers the periphery of the CNT fiber bundles, whereby it is possible to prevent contamination of the CNT film by foreign substances. Since the CNT fiber bundles and the resin layer are connected by the impregnated layer, it is possible to prevent from falling off of the CNT fibers so as to enhance the durability of the sensor function.

As described above, the strain sensor of the present invention is capable of inhibiting the occurrence of contamination of the CNT film by foreign substances and enhancing the durability of the sensor function while improving the linearity of the resistance change and responsiveness. Accordingly, the strain sensor of the present invention can be widely utilized as a pressure sensor, a load cell, a torque sensor, a position sensor and the like.

DETAILED DESCRIPTION OF THE INVENTION

Hereinbelow, embodiments of the strain sensor of the present invention shall be described in detail referring to the drawings.

First Embodiment

Figure 1A:
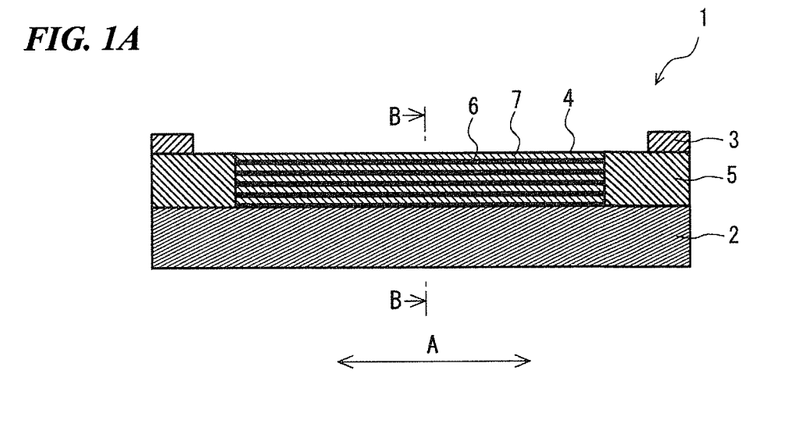
FIGS. 1A, 1B and 1C are respectively a cross-sectional view of the strain sensor according to the first embodiment of the present invention, a plan view thereof, and a cross-sectional view at B-B line of FIG. 1A.
Figure 1B:
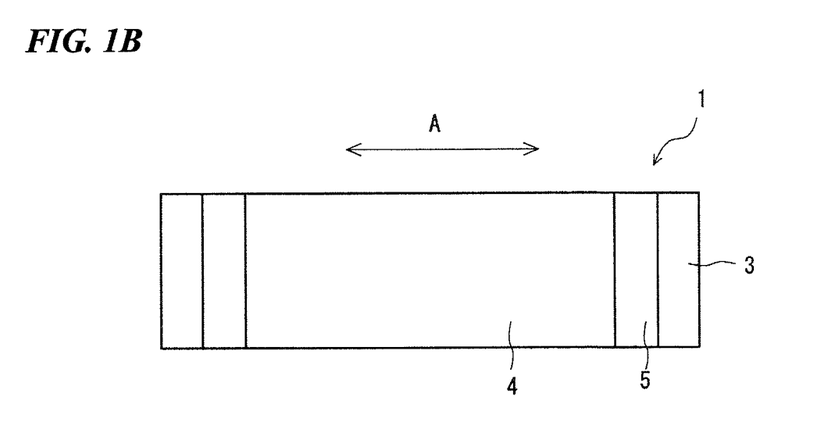
Figure 1C:
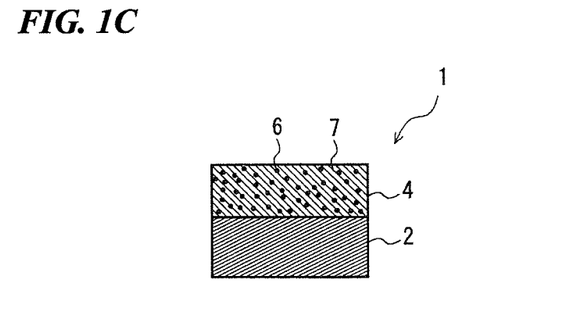

Referring to FIGS. 1A to 1C, a strain sensor 1 is provided with a substrate 2, a CNT film 4 that is provided on the surface side of this substrate 2 and that has a plurality of CNT fibers oriented in one direction, and a pair of electrodes 3 that are arranged at both ends of the CNT fibers in the orientation direction A.
(Substrate)

The substrate 2 is a plate-shaped body that has flexibility. The size of the substrate 2 is not particularly limited, and for example the thickness may be between 10 μm and 5 mm, the width between 1 mm and 5 cm, and the length between 1 cm and 20 cm.

The material of the substrate 2 is not particularly limited provided it has flexibility, with examples including synthetic resin, rubber, a nonwoven fabric, and a metal or metallic compound with a deformable shape or material. The substrate 2 should be an insulator or a material with a high resistance value, but in the case of using a material with a low resistance value such as metal, an insulating layer or a material with a high resistance value may be coated on the surface thereof. Among these, a synthetic resin or rubber is preferred, with rubber being particularly preferred. By using rubber, it is possible to further increase the flexibility of the substrate 2.

Examples of a synthetic resin include for example phenol resin (PF), epoxy resin (EP), melamine resin (MF), and urea-formaldehyde resin (urea resin, UF), unsaturated polyester resin (UP), alkyd resin, polyurethane (PUR), thermosetting polyimide (PI), polyethylene (PE), high-density polyethylene (HDPE), medium-density polyethylene (MDPE), low-density polyethylene (LDPE), polypropylene (PP), polyvinyl chloride (PVC), polyvinylidene, polystyrene (PS), polyvinyl acetate (PVAc), acrylonitrile butadiene styrene resin (ABS), acrylonitrile-styrene resin (AS), polymethyl methacrylate (PMMA), polyamide (PA), polyacetal (POM), polycarbonate (PC), modified polyphenylene ether (m-PPE), polybutylene terephthalate (PBT), polyethylene terephthalate (PET), cyclic polyolefin (COP), and the like.

Examples of the rubber include for example natural rubber (NR), isobutylene-isoprene rubber (IIR), polyisoprene rubber (IR), ethylene propylene rubber (EPDM), butadiene rubber (BR), urethane rubber (U), styrene-butadiene rubber (SBR), silicone rubber (Q), chloroprene rubber (CR), chlorosulphonated polyethylene rubber (CSM), acrylonitrile-butadiene rubber (NBR), chlorinated polyethylene (CM), acrylic rubber (ACM), epichlorohydrin rubber (CO, ECO), fluororubber (FKM), PDMS, and the like. Among these, natural rubber is preferred from the aspect of strength.
(Electrodes and Conductive Layer)

The pair of electrodes 3 are allocated at both end portions of the substrate 2 in the longitudinal direction A of the surface (orientation direction of CNT fibers). Specifically, the electrodes 3 are respectively arranged on the surface of a pair of conductive layers 5 that are arranged spaced apart at both end portions in the longitudinal direction A of the surface of the substrate 2.

Each conductive layer 5 raises the electrical connectivity of the electrode 3 and the CNT film 4. The material that forms the conductive layer 5 is not particularly limited provided it has conductivity, and for example it is possible to use a conductive rubber-based adhesive. By using an adhesive as the conductive layer 5, it is possible to increase the fixation of the substrate 2, the electrode 3 and the CNT film 4 at both ends, and so it is possible to improve the durability of the stain sensor 1.

The electrode 3 has a belt-like shape. The pair of electrodes 3 is arranged in a mutually parallel manner in the width direction of the substrate 2. As the material that forms the electrodes 3, it is possible to use metal such as copper, silver, aluminum and the like.

While it is possible for the shape of the electrodes 3 to be for example membranous, planar, meshlike and the like, it is preferable for them to be meshlike. By using meshlike electrodes 3 in this way, it is possible to raise the adhesion and fixation with the conductive layer 5. As this kind of mesh-shape electrode 3, it is possible to use a metal mesh, or one consisting of metal that is vapor deposited or sputtered on a nonwoven fabric. The electrode 3 may also be formed by the application of a conductive adhesive agent.
(CNT Film)

The CNT film 4 has a plurality of CNT fiber bundles 6 consisting of a plurality of CNT fibers oriented in one direction and a resin layer 7 that covers the peripheral surface of the plurality of CNT resin bundles 6 and an impregnated portion. That is to say, the CNT fiber bundle 6 is constituted from a plurality of CNT fibers, and the resin layer 7 covers the periphery of this CNT fiber bundle 6. The resin layer 7 is partially impregnated to the periphery of the CNT fiber bundle 6 to form the impregnated portion. Then, a non-impregnated portion, which is not impregnated with the resin layer, is provided within the CNT fiber bundle 6 such that the non-impregnated portion is wrapped with the impregnated portion. Also the CNT film 4 has a rectangular shape in planar view, and both end portions of the CNT film 4 in the longitudinal direction A are connected with the respective electrode 3 via the conductive layer 5.

The CNT film 4 has a plurality of CNT fiber bundles 6 that are oriented in one direction (the facing direction A of the pair of electrodes 3). Due to the CNT fiber bundles 6 being oriented in this way, in the case of strain being applied in a direction in which the pair of electrodes 3 move apart (the direction A), it is possible to obtain a resistance change of the strain sensor 1 arising from the breakage and separation of the CNT fibers that constitute the non-impregnated portion of each CNT fiber bundle 6, and expansion and contraction of the break space (gap) of each CNT fiber bundle 6.

More specifically, each CNT fiber bundle 6 has a bundle structure consisting of CNT fibers. At an arbitrary cross section on the non-impregnated portion of any one of the CNT fiber bundles 6 (CNT film 4), there exist both CNT fibers that are not broken and gaps at which the CNT fibers are broken and separated. Also, the pressure in this gap is considered to be lower than the atmospheric pressure (negative pressure), and so during contraction of the strain sensor 1 (during release of the strain), the contraction of the strain sensor is biased by the contraction force of this gap. Moreover, within this gap, since friction among the CNT fibers and between the CNT fibers and the periphery resin is reduced, movement of the CNT fibers is not easily restricted by the residual stress of the resin.

Each CNT fiber bundle 6 consists of a plurality of CNT fibers. A CNT fiber refers to a single, long CNT. Also, the CNT fiber bundle 6 has connecting portions at which the end portions of CNT fibers connect. The CNT fibers connect in the longitudinal direction of the CNT fibers. In the CNT film 4, by using the CNT fiber bundle 6 in which CNT fibers connect in the longitudinal direction, it is possible to form the CNT film 4 with a large length in the orientation direction of the CNT fiber bundle 6, and so it is possible to increase the longitudinal direction length of the strain sensor 1 and improve the sensitivity.

Figure 2:
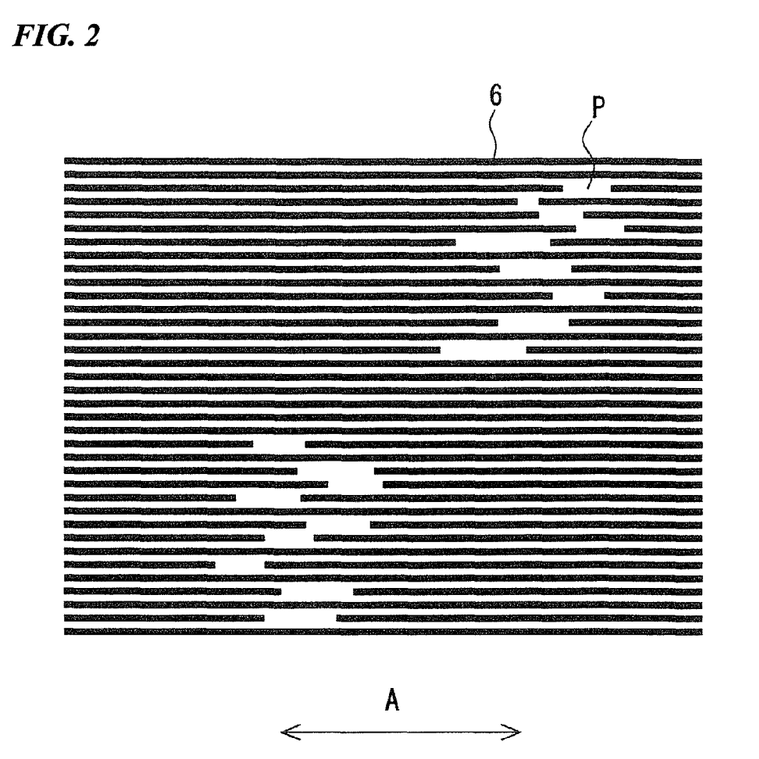
FIG. 2 is a schematic view that shows the CNT film of the strain sensor of FIG. 1.

Also, the non-impregnated portions of the plurality of CNT fiber bundles 6 may have a break place P in the longitudinal direction A as shown in FIG. 2. This break place P can be formed by, for example after laminating the CNT film 4 on the substrate 2, extending it in the longitudinal direction A. This break places P are preferably formed at a random locations of the non-impregnated portions in each CNT fiber bundle 6. Due to the break places P being formed randomly, the lengths (gaps) of the break places P are prevented from all changing (extending and contracting) at the same timing, and so it is possible to prevent a rapid fluctuation of the resistance change, and therefore possible to improve the linearity. Note that it is preferable for the CNT fiber to exist in fragments at this break place P. Also, a plurality of break places P may be formed in the non-impregnated portion of one CNT fiber bundle 6.

The lower limit of the length of the break place P when stationary is preferably 5 µm, with 10 µm being more preferable. In the case of the length of the break place P being less than the lower limit, there is a risk of linearity of the resistance change during extension and contraction of the CNT film 4 not being sufficiently obtained. On the other hand, the upper limit of the length of the break place P when stationary is preferably 50 µm, with 40 µm being more preferable. In the case of the length of the break place P exceeding the upper limit, there is a risk of the resistance of the strain sensor 1 being unnecessarily high.

A plurality of the CNT fiber bundles 6 may connect or make contact in a mesh shape by the connecting portions or the like. In such a case, the end portions of three or more CNT fibers may join together at the connecting portion, or the end portions of two CNT fibers may be joined to the middle portion of another CNT fiber. As a result of a plurality of the CNT fiber bundles 6 forming this kind of mesh structure, the CNT fiber bundles 6 make close contact, and it is possible to reduce the resistance of the CNT film 4. Moreover, the connecting portions of the CNT fiber bundles 6 become the main base point, and may connect or make contact with not only adjacent CNT fiber bundles 6, but also CNT fiber bundles 6 that leap over a number of them in between. In this way, in the case of a CNT film 4 that consists of a plurality of CNT fiber bundles 6 in a mesh shape, it is possible to achieve a strain sensor with a lower resistance value and a stronger rigidity in the direction perpendicular to the CNT fiber bundles 6. Note that connection between the CNT fiber bundles 6 refers to the connecting portion and the CNT fiber bundle 6 electrically connecting, with the case of an electrical connection between portions other than the connecting portion of the CNT fiber bundles 6 also included in a connection. Contact between the CNT fiber bundles 6 refers to the connecting portion and the CNT fiber bundle 6 being in contact but not electrically connected, with the case of portions other than the connecting portion of the CNT fiber bundles 6 being in contact but not electrically connected also included in contact.

Note that in the CNT fiber bundle 6, each CNT fiber is essentially in a state of being oriented in the longitudinal direction of the CNT fiber bundle 6, and not twisted. By using this kind of CNT fiber bundle 6, it is possible to increase the uniformity of the CNT film 4, and increase the linearity of the strain sensor.

At the connecting portion, the CNT fibers are joined together by intermolecular force. For this reason, even in the case of a plurality of CNT fiber bundles 6 being connected in a mesh shape by the connecting portion, an increase in the resistance due to the presence of the connecting portion is inhibited.

The CNT film 4 may consist of a single-layer structure or a multi-layer structure in which the CNT fiber bundles 6 are arranged approximately parallel in a planar shape. However, in order to ensure a certain degree of conductivity, a multi-layer structure is preferable.

As the CNT fiber (CNT), it is possible to use either a single-layer single wall nanotube (SWNT), a multi-wall nanotube (MWNT), but from the point of conductivity and heat capacity, a MWNT is preferable, and a MWNT with a diameter of between 1.5 nm and 100 nm is more preferable.

It is possible to manufacture the CNT fiber with a publicly known method, and for example it can be manufactured by chemical vapor disposition (CVD), are discharge, laser ablation, the DIPS method, direct injection pyrolytic synthesis (DIPS), the CoMoCAT process and the like. Among these, from the point of being able to efficiently obtain CNT (MWNT) of the desired size, it is preferable to manufacture it with CVD that uses an iron catalyst and ethylene gas. In this case, after forming an iron or nickel film serving as the catalyst on a silica glass substrate or a silicon substrate with an oxide film, it is possible to obtain a CNT crystal of the desired length grown with a vertical orientation.

The resin layer 7 is a layer that contains resin as the main component, and that covers the peripheral surface of the plurality of CNT fiber bundles 6. Examples of the main component of the resin layer include synthetic resin or rubber illustrated as the material of the substrate 2, with rubber being preferred among these. By using rubber, it can exhibit a sufficient CNT fiber protecting function with respect to large strain.

It is preferable for the resin layer 7 to be formed using an aqueous emulsion. An aqueous emulsion is an emulsion in which the main component of the dispersion medium is water. CNT is highly hydrophobic. For that reason, by forming the resin layer 7 using an aqueous emulsion, that is to say, by forming the resin layer 7 by for example coating with or immersing in an aqueous emulsion having resin as a dispersed material, it is possible to achieve a state in which the resin layer 7 is filled in the periphery of the CNT fiber bundle 6 without being completely impregnated in the interior of the CNT fiber bundle 6. By doing so in this manner, it is possible to inhibit the impact on a resistance change of the CNT film 4 arising from the resin that forms the resin layer 7 completely penetrating into the CNT fiber bundle 6, and inhibit a drop in the strain sensitivity of the CNT film 4 due to the resin layer 7. It is possible to form a more stable resin layer 7 by the aqueous emulsion passing through a drying stage.

Also, the CNT fiber bundle 6 has a bundle structure that consists of a plurality of CNT fibers. Specifically, the plurality of CNT fibers in the CNT fiber bundle 6 form a long CNT fiber bundle 6 while mutually overlapping. In this case, the connection of the plurality of CNT fibers forms a long CNT fiber bundle 6 that is provided with a current path. This is the reason why CNT fibers do not lose their current path even when broken in the longitudinal direction.

Provided the resin layer 7 has not completely impregnated to the plurality of CNT fibers that form a minimum bundle structure, there is no problem even if it has partially impregnated the middle of the CNT fiber bundle 6 so as to form the impregnated portion. A bundle structure with a small diameter that constitutes the CNT fiber bundle 6 is considered to be a small diameter bundle in the CNT fiber bundle 6. Conversely, when the resin layer 7, which is an insulator, has impregnated until the surface of CNT fibers inside the CNT fiber bundle 6, whereby the resin layer 7 covers the surface of the CNT fibers, a plurality of CNT fibers that are broken lengthwise by the application of strain can no longer make contact with adjacent CNT fibers, and so the current path is lost, leading to a sudden increase in resistance. As a result, this is not preferred since it leads to a drop in the linearity of the CNT film 4.

By the impression of strain to CNT fibers constituting the impregnated portion of the CNT fiber bundle 6 in a direction in which the pair of electrodes 3 move apart (the direction A), they are broken and separated, whereby a gap is formed, but at a lateral cross-section, due to the decrease of the CNT fibers, it easily extends and contracts in portions in the A direction. Since the resin layer 7 also readily extends and contracts at such portions, the CNT film 4 becomes able to extend and contract while generating a change of rigidity in the A direction. By making the degree of change in its rigidity finer, it is possible to further increase the linearity of the strain sensor 1.

Although the main component of the dispersion medium of the aqueous emulsion is water, a hydrophilic dispersion media such as, for example, alcohol may be contained. The dispersoid of the emulsion is ordinary resin, but aforementioned rubber, especially crude rubber, is preferable. Also, polyurethane may be employed as the dispersoid. An example of this preferred emulsion is so-called latex, which uses water as the dispersion medium and rubber as the dispersoid, with natural rubber latex being preferred. By using natural rubber latex, it is possible to form a thin and strong protective layer.

It is good if the resin layer 7 contains a coupling agent. When the resin layer 7 includes a coupling agent, it is possible to cross-link the resin layer 7 and the CNT fiber bundles 6, and so it is possible to improve the joining force of the resin layer 7 and the CNT fiber bundles 6.

As the coupling agent, it is possible to use, for example, an amino coupling agent or a silane coupling agent such as an amino silane coupling agent, an amino titanium coupling agent, and an amino aluminum coupling agent.

The lower limit of the content of the coupling agent with respect to 100 pts. mass of the matrix resin of the resin layer 7 is preferably 0.1 pt. mass, with 0.5 pt. mass being more preferable. On the other hand, the upper limit of the content of the coupling agent with respect to 100 pts. mass of the matrix resin of the resin layer 7 is preferably 10 pts. mass, with 5 pts. mass being more preferable. When the content of the coupling agent is less than the lower limit, there is a risk of the formation of the crosslinked structures of the CNT fiber bundle 6 and the resin layer 7 being insufficient. Conversely, when the content of the coupling agent exceeds the upper limit, there is a risk of an increase of residual amine that does not form crosslinked structures, leading to a reduction in quality of the strain sensor 1.

The resin layer 7 preferably contains a dispersant that has adsorptivity with respect to the CNT fiber bundle 6. As a dispersant that has this kind of adsorptivity, it is possible to use one in which the adsorptive part is a salt structure (for example, alkyl ammonium salt or the like) or one having in the molecule a hydrophilic base (such as polyether) that is capable of interacting with a hydrophobic group (such as an alkyl chain or aromatic ring) of the CNT fiber bundle 6.

The lower limit of the content of the dispersant with respect to 100 pts. mass of the matrix resin of the resin layer 7 is preferably 0.1 pt. mass, with 1 pt. mass being more preferable. On the other hand, the upper limit of the content of the dispersant with respect to 100 pts. mass of the matrix resin of the resin layer 7 is preferably 5 pts. mass, with 3 pts. mass being more preferable. When the content of the dispersant is less than the lower limit, there is a risk of the joining force of the CNT fiber bundle 6 and the resin layer 7 being insufficient. Conversely, when the content of the dispersant exceeds the upper limit, there is a risk of an increase in the dispersant that does not contribute to the joining with the CNT fiber bundles 6, leading to a reduction in quality of the strain sensor 1.

The lower limit of the width of the CNT film 4 is preferably 1 mm, with 1 cm being more preferable. On the other hand, the upper limit of the width of the CNT film 4 is preferably 10 cm, with 5 cm being more preferable. Thus, by comparatively enlarging the width of the CNT film 4, the resistance value of the CNT film 4 can be lowered as mentioned above, and variations in this resistance value can also be reduced.

The average thickness of the CNT film 4 is preferably 0.1 μm to 50 μm. That is to say, the lower limit of the average thickness is preferably 0.1 μm, with 1 μm being more preferable, and with 10 μm being further more preferable. When the thickness of the CNT film 4 is less than 0.1 μm, the resistance becomes too high, and so it cannot be used as a strain sensor. Moreover, when the average thickness of the CNT film 4 is less than 0.1 μm, formation of the film may become difficult.

On the other hand, the upper limit of the average thickness of the CNT film 4 is preferably 50 μm. The upper limit of the average thickness of the CNT film 4 is more preferably 10 μm, with 5 μm being further more preferable. Since the resin layer 7 is formed by coating with or immersing in the aqueous emulsion in which resin is the dispersant, when the average thickness of the CNT film 4 exceeds 50 μm, there is a risk of the resin layer 7 not reaching the surface of the substrate 2. If the resin layer 7 does not reach to the surface of the substrate 2 and does not join with the surface of the substrate 2, it becomes a cause of the CNT film 4 exfoliating from the resin layer 7. That is, since the surface of substrate 2 and the resin layer 7 join when the CNT film is less than 50 μm, it is possible to prevent the CNT film from exfoliating from the substrate by the resin layer. Moreover, when the average thickness of the CNT film 4 exceeds 50 μm, there is a risk of the sensitivity to strain decreasing.

Note that when it is desired to further increase the film thickness of the CNT film 4, a resin layer may be formed by coating or the like on the surface of the substrate 2 in advance, and after the CNT film 4 is arranged on that, a resin layer may be further formed by coating or the like thereupon. In case that the CNT film 4 is thin, the resin layer may be formed only on the surface of the substrate 2 because the resin in the resin layer formed in advance is impregnated to the interior of the CNT film 4.

The lower limit of the density of the CNT fiber bundles 6 in the CNT film 4 is preferably 1.0 g/cm$^3$, with 0.8 g/cm$^3$ being more preferable. On the other hand, the upper limit of the density of the CNT fiber bundles 6 in the CNT film 4 is preferably 1.8 g/cm$^3$, with 1.5 g/cm$^3$ being more preferable. When the density of the CNT fiber bundles 6 in the CNT film 4 is less than the lower limit, there is a risk of the resistance value of the CNT film 4 increasing. Conversely, when the density of the CNT fiber bundles 6 in the CNT film 4 exceeds the upper limit, there is a risk of a sufficient change in resistance not being obtained.

Figure 3:
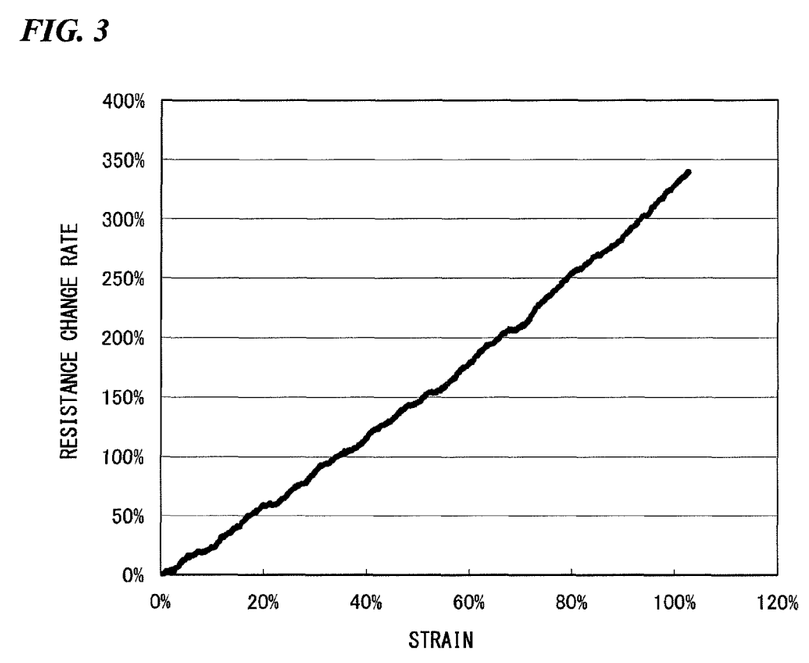
FIG. 3 is a graph that shows the relationship between the strain amount and the resistance rate of change of the strain sensor of FIG. 1.

According to this strain sensor 1, due to the CNT film 4 being provided as described above, in response to strain of the substrate 2, since the resistance of the CNT film 4 changes as a result of the strain (extension and contraction) of breakage, separation and the break places P of the CNT fibers that constitute the CNT fiber bundles 6 in the CNT film 4, it is capable of functioning as a strain detection sensor with a high linearity of resistance change. That is to say, since changes in the connection state and distance of the CNT fibers in the strain sensor 1 partially and gradually arise, the electrical resistance of the CNT film 4 changes in a linear manner as shown in FIG. 3.

Moreover, a space isolated from the outside between the broken end portions of the CNT fibers is formed within the CNT fiber bundle 6, and since this space has a contraction force, and the broken end portions of the CNT fibers quickly reestablish contact during contraction of the strain sensor 1 by movement of the CNT fibers in this space, the strain sensor 1 can obtain a high responsiveness.

In addition, the strain sensor 1 is capable of inhibiting the occurrence of contamination of the CNT film 4 by foreign substances and enhancing the durability of the sensor function while improving the linearity of the resistance change and responsiveness by the plurality of CNT fiber bundles 6 that are oriented in the longitudinal direction A and the resin layer 7 that covers them.

Note that the strain of the substrate 2 includes not only extension and contraction in the longitudinal direction A but also deformation in the normal direction of the substrate 2 and torsion centered on the longitudinal direction and the like. The strain sensor 1 is also capable of detecting this kind of strain of the substrate 2.

(Method of Manufacture)

It is possible to manufacture the strain sensor 1 according to the following manufacturing processes.

Figure 4A:
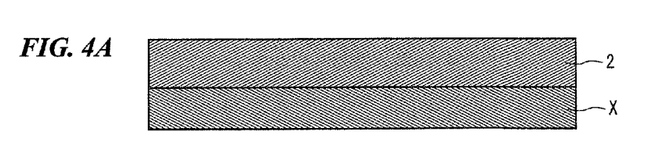
FIG. 4A to FIG. 4E are cross-sectional views that show the method of manufacture of the strain sensor of FIG. 1.

(1-1) As shown in FIG. 4A, the substrate 2 is formed on a mold release plate such as a slide glass. Specifically, a slide glass X is immersed in latex or a resin solution, and then dried. Thereby, it is possible to form the substrate 2 with a rectangular shape in a plan view made of resin on the surface of the slide glass X. Note that as a mold release plate another plate material besides slide glass may be used.

Figure 4B:
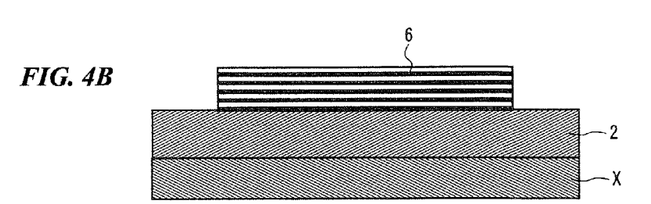

(1-2) As shown in FIG. 4B, a plurality of CNT fiber bundles 6 are arranged on the surface of the plate 2. Specifically, a CNT sheet (film) that consists of a plurality of CNT fiber bundles 6 oriented in one direction is arranged on the surface of the substrate 2. At this time, the orientation of the CNT sheet is adjusted so that the CNT fiber bundles 6 are oriented in the facing direction (longitudinal direction) of the pair of electrodes 3 that are to be laminated in a subsequent process.

Figure 5:
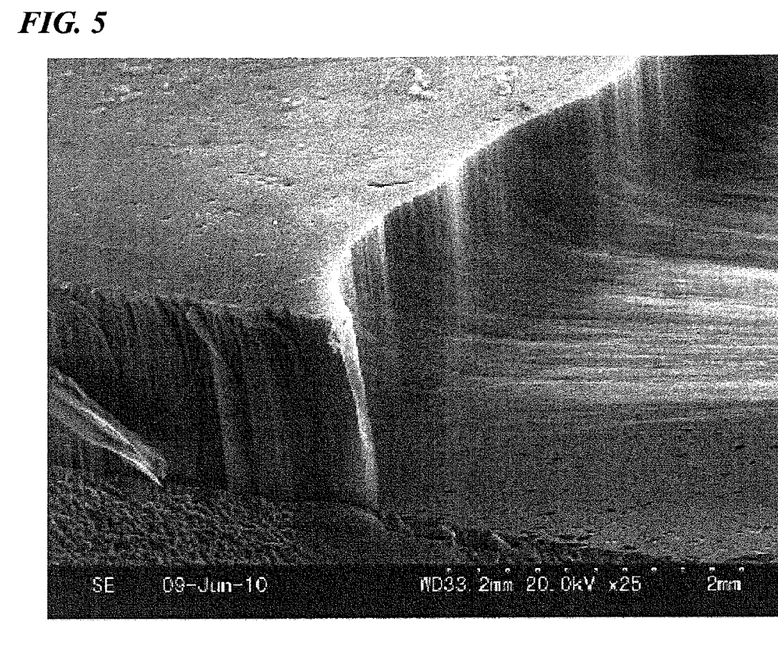
FIG. 5 is a scanning electron microscope photograph that shows the formation location of CNT fiber bundles.

Note that the CNT sheet can be obtained by forming a catalyst layer on a growth substrate, growing the CNT fibers oriented in a specified direction by CVD, drawing them as is without twisting as shown in FIG. 5, and then after winding them on another plate or cylinder, taking out the required amount of CNT fibers in a sheet form. The obtained CNT fiber bundle 6 that is obtained in this way is a structure that consists of a plurality of CNT fibers, and has connecting portions at which the CNT fibers connect in the longitudinal direction.

Figure 4C:
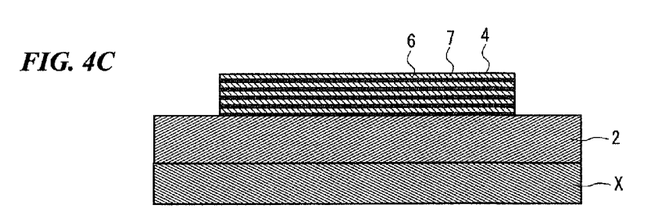

(1-3) As shown in FIG. 4C, the peripheral surface of the CNT fiber bundles 6 is covered with the resin layer 7. Specifically, the resin layer 7 is formed by immersing the entirety including the slide glass X in latex, or coating the latex on the surface of the CNT fiber bundles 6 (CNT sheet), to complete the CNT film 4. As stated above, an aqueous emulsion having hydrophilicity is used as this latex. In this process, the resin layer 7 partially impregnates to the CNT fiber bundles 6.

Figure 4D:
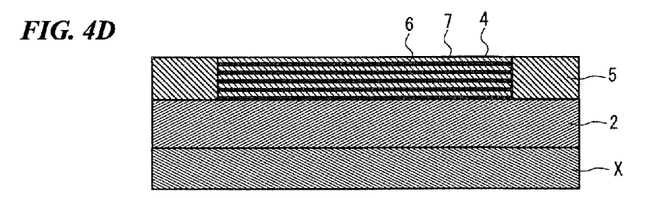

(1-4) As shown in FIG. 4D, a conducting rubber-based adhesive is coated on both end portions in the longitudinal direction of this substrate 2, to form the conductive layer 5. When doing so, the conductive layer 5 may be formed so that the conductive layer 5 covers a portion of the CNT film 4.

Figure 4E:
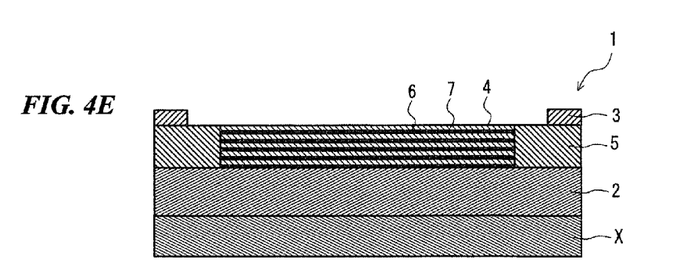

(1-5) As shown in FIG. 4E, an electrode 3 is laminated on the surface of each conductive layer 5.

(1-6) After the lamination of the electrodes 3, it is possible to obtain at least one pair of strain sensors 1 by cutting out these laminates from the surface of the slide glass. Both end portions in the width direction in the slide glass may be cut off. Also, it is possible to manufacture a plurality of the strain sensors 1 from one laminate by sectioning in the longitudinal direction. Note that after being segmented from the slide glass, by extending the strain sensor 1 in the facing direction of the electrodes 3, it is possible to form the break places P in the CNT fiber bundles 6.

Note that the aforementioned (1-2) that is a lamination step of the CNT film 4 can also be performed in the manner of the following step.

Figure 6:
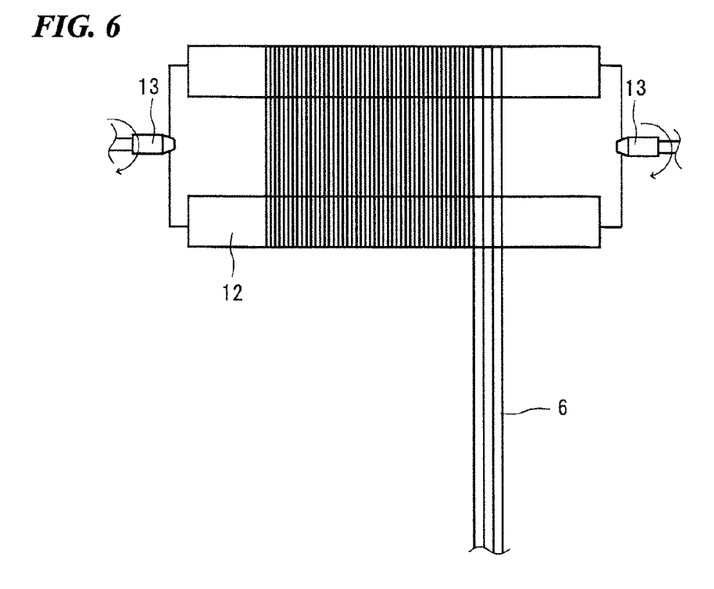
FIG. 6 is a schematic view that shows the formation location of the CNT film.

(1-2') As shown in FIG. 6, the CNT fiber bundles 6 are wrapped on the slide glass (substrate 2). By doing so, it is possible to obtain a plurality of CNT fiber bundles 6 oriented in one direction (the facing direction of the pair of electrodes 3). When doing so, both ends of the slide glass (substrate 2) are held by a pair of support tools 13, and by rotating them centered on the longitudinal direction of the slide glass (substrate 2), it is possible to wrap the CNT fiber bundles 6. Note that both end portions in the width direction of the slide glass may be masked with masking tape 12 or the like. After the desired amount of CNT fiber bundles 6 have been wrapped on the slide glass (substrate 2), the masking tap 12 is removed, resulting in the state shown in FIG. 4B.

As stated above, the resin layer 7 is preferably not impregnated into the inner portion of the CNT fiber bundles. By thus not impregnating the resin layer that covers the CNT fiber bundles into the inner portion of the CNT fiber bundles, since it is possible to prevent deformation in the orientation direction of the CNT fiber bundles from being impeded by the resin, while protecting the CNT fiber bundles, it is possible to further increase the sensitivity of the strain sensor and the linearity of the resistance change. Also, since spaces are readily formed in the CNT fiber bundles, it is possible to further improve the responsiveness.

The resin layer 7 is preferably formed using an aqueous emulsion. By using an aqueous emulsion in the formation of the resin layer in the way, it is possible to form the resin layer that covers the periphery of the CNT fiber bundles easily and reliably by for example coating or immersion without impregnating it into the CNT fiber bundles.

It is good if the CNT fiber bundles 6 have connection portions at which the CNT fibers connect with each other in the longitudinal direction. In this way, by using the CNT fiber bundles in which CNT fibers are connected to each other in the longitudinal direction, it is possible to favorably use the strain sensor with excellent linearity in its resistance change for various uses.

The plurality of CNT fiber bundles 6 preferably have break places in the longitudinal direction. By the CNT fiber bundles having break places in the longitudinal direction (orientation direction) in this manner, since the resistance change of the strain sensor is imparted by changes in the interval (gap) of these break places chiefly during extension and contraction of the strain sensor, it is possible to further increase the linearity of the resistance change and responsiveness of the strain sensor, and increase the reproducibility of the resistance change.

Because the CNT fiber bundle has the impregnated portion, the bonding force between the CNT film and the substrate, and the strength of the CNT film are increased. Because the CNT fiber bundle also has the non-impregnated portion, it is possible to prevent deformation in the orientation direction of the CNT fiber bundle from being impeded by the resin, so that it is possible to further increase the sensitivity of the strain sensor and the linearity of the resistance change. Also, since spaces are readily formed in the CNT fiber bundle, it is possible to further improve the responsiveness of the sensor. Further, rupture of the CNT fiber bundle 6 can be induced in accordance with a degree of an amount of resin impregnated to the peripheral layer of the CNT fiber bundle 6. In this respect, the responsiveness of the strain sensor 1 can be increased. This operation changes the distribution or gradation of the CNT fibers so that the distribution or gradation changes can be observed by a microscope.

Second Embodiment

Figure 7:
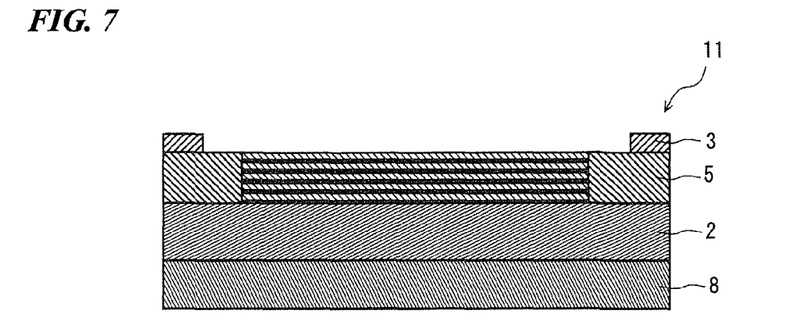
FIG. 7 is a cross-sectional view that shows the strain sensor according to the second embodiment of the present invention.

A strain sensor 11 of FIG. 7 is mainly provided with the substrate 2, the pair of electrodes 3, the CNT film 4, and an assist layer 8 that is laminated on the back surface of the substrate 2. The substrate 2, the electrodes 3 and the CNT film 4 are the same as the strain sensor 1 shown in FIG. 1A to 1C, so they shall be given the same reference numerals, and their explanation shall be omitted.

The assist layer 8 is a material with a different Young's modulus than the substrate 2. By having this assist layer 8 be a member with a lower Young's modulus than the substrate 2, it is possible to enhance the following performance in the case of directly affixing the strain sensor 11 to skin or the like. Also, by making the assist layer 8 be a member with a higher Young's modulus than the substrate 2, it is possible to control the extension/contraction rate of the strain sensor 11 to prevent a delay in strain detection.

It is possible to suitably select the material of the assist layer 8 in accordance with the design conditions of the Young's modulus, and besides the synthetic resin or rubber and the like illustrated above, it is possible to use a woven fabric, non-woven fabrics or knit as the material of the substrate 2. In particular, in the case of using a knit as the assist layer 8, it is possible to entirely or partially impregnate the substrate in the fiber layer of the knit. By doing so, the bonding strength between the knit and the substrate 2 increases, and moreover the knit plays a role of inhibiting full extension of the strain sensor 11. By arranging a knit in this way on the backmost surface side, it is possible to achieve a strain sensor that is suited to being affixed to clothing and the like, and that has a good detection sensitivity.

In the case of the Young's modulus of the assist layer 8 being lower than the substrate 2, the upper limit of the ratio of the Young's modulus of the assist layer 8 with respect to the Young's modulus of the substrate 2 is preferably 0.9, and more preferably 0.7. When the ratio of Young's moduli exceeds the upper limit, there is a risk of the following performance enhancement effect by the assist layer 8 with respect to movement of the body on which the strain sensor is affixed not being sufficiently obtained. On the other hand, the lower limit of the ratio of the Young's modulus of the assist layer 8 with respect to the Young's modulus of the substrate 2 is preferably 0.4, and more preferably 0.5. When the ratio of Young's moduli is less than the lower limit, there is a risk that the assist layer 8 and the substrate 2 may easily exfoliate due to extension and contraction.

In the case of making the Young's modulus of the assist layer 8 be higher than the substrate 2, the upper limit of the ratio of the Young's modulus of the assist layer 8 with respect to the Young's modulus of the substrate 2 is preferably 2.5, and more preferably 2.0. When the ratio of the Young's moduli exceeds the upper limit, the strain sensor 11 is hindered from deforming, leading to the risk of a drop in the sensor sensitivity. On the other hand, the lower limit of the ratio of the Young's modulus of the assist layer 8 with respect to the Young's modulus of the substrate 2 is preferably 1.1, and more preferably 1.5. When the ratio of Young's moduli is less than the lower limit, there is a risk of the strain sensor extension/contraction ratio adjustment effect imparted by the assist layer 8 not being sufficiently acquired.

Although the average thickness of the assist layer 8 is not particularly limited, it is possible to make it for example between 10 μm and 1,000 μm.

The strain sensor 11, similarly to the strain sensor 1 of the first embodiment, is capable of inhibiting the occurrence of contamination of the CNT film 4 by foreign substances and enhancing the durability of the sensor function while improving the linearity of the resistance change and responsiveness by the plurality of CNT fiber bundles 6 that are oriented in the longitudinal direction A and the resin layer 7 that covers them. In addition, it is possible with the assist layer 8 to enhance the following performance with respect to movement of the body on which the strain sensor is affixed, and the detection sensitivity.

Third Embodiment

Figure 8:
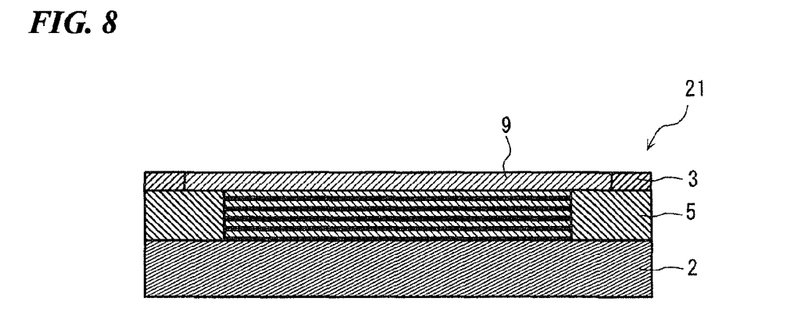
FIG. 8 is a cross-sectional view that shows the strain sensor according to the third embodiment of the present invention.

A strain sensor 21 of FIG. 8 is mainly provided with the substrate 2, the pair of electrodes 3, the CNT film 4, and an assist layer 9 that is laminated on the surface of the CNT film 4. The substrate 2, the electrodes 3 and the CNT film 4 are the same as the strain sensor 1 shown in FIGS. 1A to 1C, so they shall be given the same reference numerals, and their explanation shall be omitted. In addition, the assist layer 9 may be the same as the one in the strain sensor 11 of FIG. 11. Note that the assist layer 9 preferably also covers the conductive layer 5 as shown in FIG. 8.

Similarly to the strain sensor 11 of the second embodiment, it is possible by means of the assist layer 9 laminated on the surface of the CNT film 4 to improve the following performance of the strain sensor 21 with respect to movement of the body on which the strain sensor is affixed and also its detection sensitivity. Also, it is possible to more reliably prevent contamination of the CNT film 4 by foreign substances. The assist layers may be provided on both sides of the strain sensor.

(Method of Using Strain Sensor)

By mounting this strain sensor on the chest of a human body, it is possible to detect the breathing of the wearer. As stated above, since this strain sensor has high linearity and responsiveness, even when the wearer is physically active it can detect the person's breathing with high accuracy by following the movements of the chest. Note that when mounting this strain sensor on the chest with the purpose of detecting breathing in this way, it is preferred to mount it in the vicinity of the solar plexus so that the orientation direction of the CNT fibers matches the chest circumference direction (left-right direction).

Moreover, by mounting this strain sensor on a finger of a human body, it can detect movements of the finger. For example, by mounting this strain sensor at the base of a finger so that the orientation direction of the CNT fibers is perpendicular to the bending direction of the finger, it is possible to sense changes in the girth of the finger, and possible to detect the state and degree of strength of the finger.

Also, assist layers may be provided on each of the back surface of the substrate and the surface of the CNT film of the strain sensor. By thus providing assist layers on both surface sides of the strain sensor, it is possible to improve the adhesiveness to the measuring object and the detection sensitivity with good balance.

Moreover, in this strain sensor, the CNT film may have a portion capable of cleaving along a direction perpendicular with the orientation of the CNT fiber bundles. By forming a portion capable of cleaving along a direction perpendicular with the orientation of the CNT fiber bundles in the CNT film in this way, the transient responsiveness of resistance changes increases, and it can exhibit a superior sensor function with respect to larger strain (extension and contraction). In this case, break places of the CNT fiber bundles are easily formed in the portion capable of cleaving.

Fourth Embodiment

Figure 9:
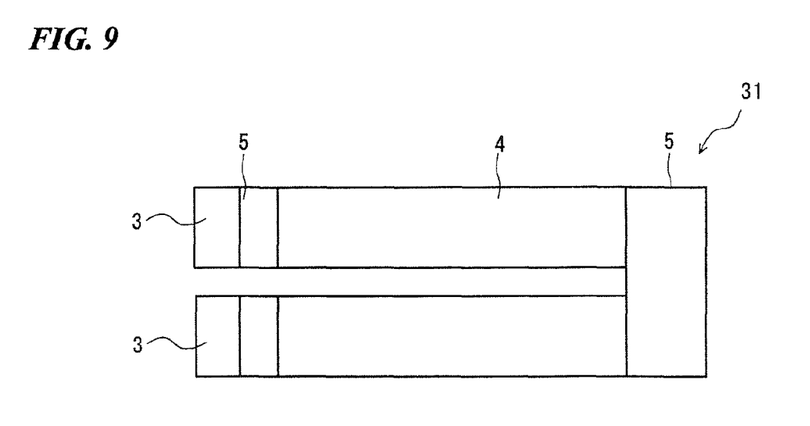
FIG. 9 is a plan view that shows the strain sensor according to the fourth embodiment of the present invention.

In the strain sensor 31 shown in FIG. 9, two CNT films 4 are arranged side by side to be parallel in the longitudinal direction (CNT fiber orientation direction), and one end of each of these CNT films 4 is connected by the conductive layer 5 in a direction perpendicular with the longitudinal direction. In this strain sensor 31, the electrode 3 is not provided at the connection side of the CNT films 4, and instead electrodes 3 that connect with each CNT film 4 are separately provided at the opposite side of the connection side. In this strain sensor 31, although the orientation of the CNT fibers changes by 180° at the conductive layer 5, the pair of electrodes 3 are arranged in a prescribed manner at both ends in the orientation direction of the CNT fibers. In this strain sensor 31, it is possible to double the orientation length of the CNT fibers that the CNT film 4 has, while maintaining the length in the longitudinal direction as is. It is also possible to connect three or more CNT films 4 in the direction perpendicular with the longitudinal direction by the conductive layer 5.

Moreover, the substrate of the strain sensor is not limited to the plate-shaped body consisting of a perfect rectangular parallelepiped, and it is possible to use one that is deformed. For example, it is possible to broaden the use of the strain sensor by making the substrate have a cylindrical or corrugated shape. The CNT fiber bundles may also use CNT fibers that are obtained by spinning CNT. Moreover, another pair of facing electrodes may be provided in a direction perpendicular with the facing direction of the pair of electrodes. By providing two pairs of electrodes that are orthogonal in this way, it is possible to use this strain sensor as a two-dimensional sensor. Also, by covering the front and back surface of the strain sensor with a resin having adhesiveness, it can be also be used by being easily affixed to locations of a human body or structure where strain is to be measured.

WORKING EXAMPLES

Hereinbelow, the present invention shall be described in further detail with working examples, but the present invention is not limited by these working examples.

Working Example 1

Figure 10A:
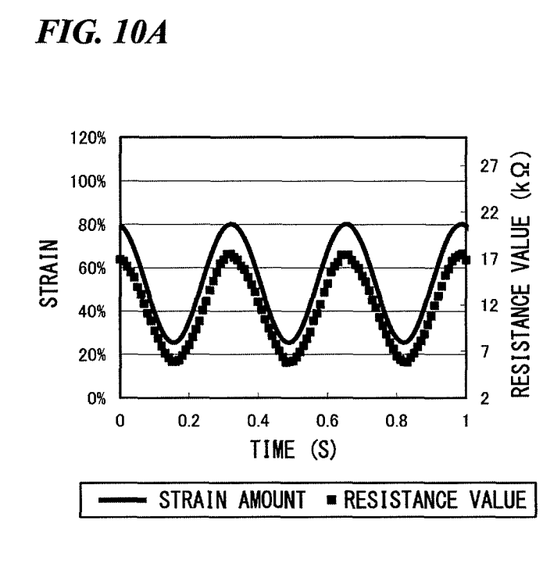
FIGS. 10A and 10B are graphs that show the relationship between the strain amount and resistance value of the strain sensor of Working Example 1.
Figure 10B:
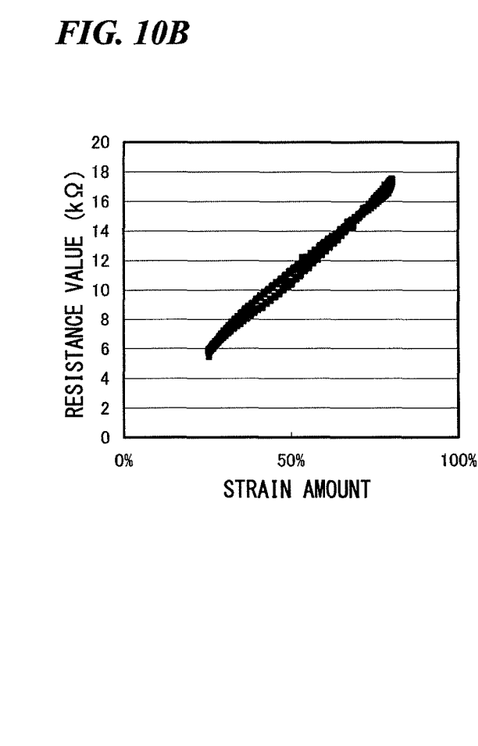

The change in resistance of the strain sensor was measured when applying a tensile force in the orientation direction A of the CNT fibers to the strain sensor shown in FIGS. 1A to 1C, and periodically altering the strain amount (extension with respect to the A direction length of the strain sensor) between 25% and 80% at a period of 3 Hz. The results are shown in FIGS. 10A and 10B. FIG. 10A is a graph that shows the response reactivity, which plots changes in the strain amount and the resistance value over 1 sec., and FIG. 10B is a graph that plots the relation between the strain amount and the resistance value in FIG. 10A.

Working Example 2

Figure 11A:
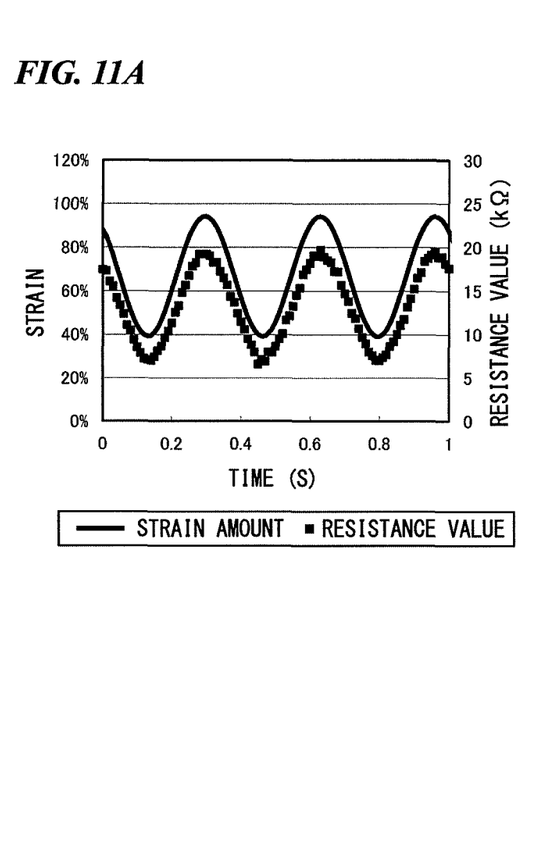
FIGS. 11A and 11B are graphs that show the relationship between the strain amount and resistance value of the strain sensor of Working Example 2.
Figure 11B:
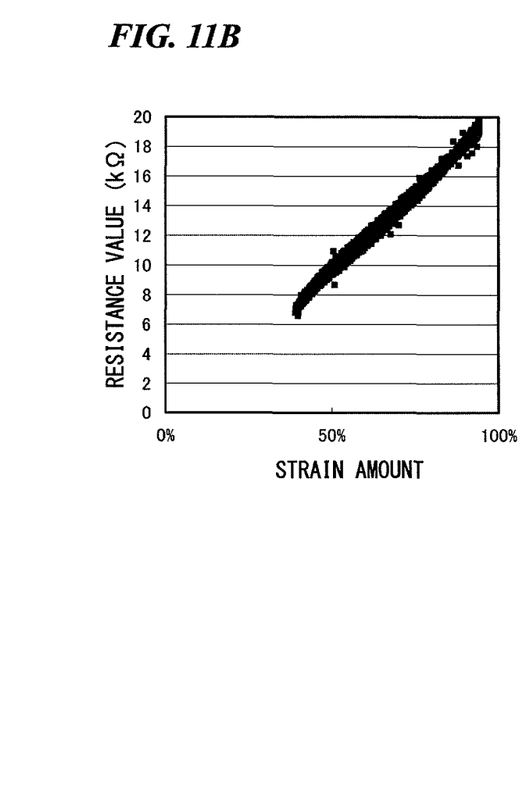

Similarly to Working Example 1, the change in resistance of the strain sensor was measured when applying a tensile force in the orientation direction A of the CNT fibers to the strain sensor shown in FIGS. 1A to 1C, and periodically altering the strain amount (extension with respect to the A direction length of the strain sensor) between 40% and 90% at a period of 3 Hz. The results are shown in FIGS. 11A and 11B. FIG. 11A is a graph that shows the response reactivity, which plots changes in the strain amount and the resistance value over 1 sec., and FIG. 11B is a graph that plots the relation between the strain amount and the resistance value in FIG. 11A.

As shown in FIG. 10A and FIG. 11A, the strain sensor of the present invention has excellent responsiveness, with the delay in the response to changes in the resistance value with respect to changes in the strain amount being extremely small. Moreover, as shown in FIG. 10B and FIG. 11B, even with repeated extension and contraction, the relation between the strain amount and the resistance value maintains an approximate line shape, and the linearity of the resistance change and durability are found to be excellent. Also, even in the case of having changed the strain amount impressed in advance as prestress as described above in the strain sensor of the present invention, it can be confirmed that the resistance value changes in a linear manner and it provides excellent responsiveness.

As described above, the strain sensor of the present invention is capable of inhibiting the occurrence of contamination of the CNT film by foreign substances and enhancing the durability of the sensor function while improving the linearity of the resistance change and responsiveness.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A strain sensor comprising:
    a substrate that has flexibility;
    a carbon nanotube (CNT) film that is provided on the surface of the substrate and that has a plurality of CNT fibers oriented in one direction; and
    a pair of electrodes that are arranged at both ends of the CNT film in the orientation direction of the CNT fibers;
    wherein the CNT film has a plurality of CNT fiber bundles that consist of the plurality of CNT fibers, and a resin layer that covers the peripheral surface of the plurality of the CNT fiber bundles and joins with the surface of the substrate, and wherein the plurality of CNT fiber bundles have break places in a longitudinal direction, and wherein the break places have lengths between 5 µm and 50 µm in a stationary state.

2. The strain sensor according to claim 1, wherein the resin layer is not impregnated within the CNT fiber bundles.

3. The strain sensor according to claim 2, wherein the resin layer is formed from an aqueous emulsion.

4. The strain sensor according to claim 1, wherein the CNT fiber bundles have connecting portions at which the CNT fibers connect in the longitudinal direction.

5. The strain sensor according to claim 1, wherein the CNT film has an average thickness of between 0.1 µm and 50 µm.

6. The strain sensor according to claim 1, wherein the CNT fiber bundles include an impregnated portion which is impregnated with the resin layer and a non-impregnated portion which is wrapped with the impregnated portion and not impregnated with the resin layer.

7. The strain sensor according to claim 1, wherein surfaces of the CNT fiber bundles are partly impregnated with resin forming the resin layer.

8. The strain sensor according to claim 1, wherein a gradation change is generated as a distribution of the CNT fibers in a longitudinal direction of the CNT fiber bundles.

* * * * *